(12) United States Patent
Hubbell

(10) Patent No.: US 9,863,787 B2
(45) Date of Patent: Jan. 9, 2018

(54) LINEAR VARIABLE DIFFERENTIAL TRANSFORMER WITH MULTI-RANGE SECONDARY WINDINGS FOR HIGH PRECISION

(71) Applicant: Parker Hannifin Corporation, Cleveland, OH (US)

(72) Inventor: Lawrence Alden Hubbell, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 252 days.

(21) Appl. No.: 14/814,972

(22) Filed: Jul. 31, 2015

(65) Prior Publication Data

US 2016/0033306 A1 Feb. 4, 2016

Related U.S. Application Data

(60) Provisional application No. 62/031,551, filed on Jul. 31, 2014.

(51) Int. Cl.
*G01D 5/22* (2006.01)
(52) U.S. Cl.
CPC .................. *G01D 5/2291* (2013.01)
(58) Field of Classification Search
CPC .................................................. G01D 5/2291
USPC ................. 318/657, 641, 601, 600
See application file for complete search history.

(56) References Cited

U.S. PATENT DOCUMENTS

| 4,847,548 A * | 7/1989 | Lafler ................... G01D 5/2291 318/657 |
| 6,034,624 A | 3/2000 | Goto et al. |
| 6,605,940 B1 * | 8/2003 | Tabrizi ................. G01D 5/2291 324/202 |
| 7,038,443 B2 | 5/2006 | Proksch et al. |
| 7,317,371 B1 | 1/2008 | Carroll |
| 8,264,315 B2 * | 9/2012 | Fox ...................... G01D 5/2291 336/130 |

* cited by examiner

*Primary Examiner* — David S Luo
(74) *Attorney, Agent, or Firm* — Renner, Otto, Boisselle & Sklar, LLP

(57) ABSTRACT

A linear variable differential transformer (LVDT) having an electrical stroke includes a probe axially movable along a length of the LVDT electrical stroke, a primary winding extending axially over the length of the LVDT electrical stroke, and a secondary winding extending axially over the length of the LVDT electrical stroke. The LVDT further includes a tertiary winding extending axially over less than the length of the LVDT electrical stroke, the tertiary winding at least partially overlapping with the secondary winding. An advantage of the LVDT in accordance with the present disclosure is that the accuracy of the position calculated from the tertiary winding is greater relative to the total stroke of the LVDT than that calculated from the secondary winding. This is accomplished while still fitting within the envelope of a standard single output LVDT.

24 Claims, 4 Drawing Sheets

LINEAR VARIABLE DIFFERENTIAL TRANSFORMER WITH MULTI-RANGE SECONDARY WINDINGS FOR HIGH PRECISION

FIELD OF INVENTION

The present disclosure relates generally to Linear Variable Differential Transformers (LVDTs), and more particularly to a multi-output LVDT with standard precision and high precision secondary windings.

BACKGROUND OF THE INVENTION

Linear variable differential transformers (LVDTs) are electromechanical transducers that convert rectilinear motion of externally coupled objects into electrical signals that are proportional to the positions of the objects. LVDTs have been utilized in conjunction with a wide range of measurement and control devices such as flowmeters, strain gages, and pressure sensors. Important characteristics of a practical LVDT include (i) the ability to produce a linear output signal over a relatively large displacement range relative to the overall length of the device, (ii) durability and reliability, and (iii) relatively low cost of manufacture.

Generally, in LVDTs a single primary winding is excited by a single-phase input signal in such a manner that there occurs, at individual locations of two differentially-connected secondary windings, reluctance that varies in response to a varying linear position of an iron core (which moves with an object of detection) so that the voltage amplitude level of a resultant single-phase inductive AC output signal indicates the linear position of the iron core. Such LVDTs are capable of detecting a linear position over a range where the induced voltage value shows linearity with respect to the linear position of the core, at and around the locations of the two secondary windings. The windings are provided in such a manner that the induced voltage varies in a differential manner, and the function of variation in the induced voltage value relative to the linear position does not change over a periodic function (e.g., a trigometric function such as a sine function).

Position accuracy provided by conventional LVDTs is generally constant throughout the range of motion of the core within the LVDT. While this may be sufficient for typical LVDT applications, it may be desirable to enhance the accuracy of the LVDT's position sensing capabilities, particularly at certain locations within the stroke of the LVDT.

SUMMARY OF THE INVENTION

An LVDT in accordance with the present disclosure provides linear position measurement with a first resolution over the entire stroke of the LVDT, and linear position measurement with a second resolution over at least a portion of the LVDT stroke, where the second resolution is higher than the first resolution.

In accordance with one aspect of the disclosure, a linear variable differential transformer (LVDT) having an electrical stroke includes: a probe axially movable along a length of the LVDT electrical stroke; a primary winding extending axially over the length of the LVDT electrical stroke; a secondary winding extending axially over the length of the LVDT electrical stroke; and a tertiary winding extending axially over less than the length of the LVDT electrical stroke, the tertiary winding at least partially overlapping with the secondary winding.

In one embodiment, the primary winding, secondary winding, and tertiary winding are concentric.

In one embodiment, the primary winding includes a first number of turns per unit length, the secondary winding comprises a second number of turns per unit length, and the tertiary winding comprises a third number of turns per unit length, the third number of turns per unit length greater than the second number of turns per unit length.

In one embodiment, the primary winding includes a first winding pitch, the secondary winding comprises a second winding pitch, and the tertiary winding comprises a third winding pitch, the third winding pitch being narrower than the second winding pitch.

In one embodiment, the secondary winding is a standard-accuracy winding that provides a proportional output over the length of the LVDT, and the tertiary winding is a high-accuracy winding that provides a proportional output for a lesser portion than the length of the LVDT.

In one embodiment, the secondary winding is a standard-accuracy winding that provides a proportional output through the full LVDT electrical stroke, and the tertiary winding is a high-accuracy winding that provides a proportional output for a lesser portion of the full LVDT electrical stroke.

In one embodiment, the windings are arranged such that the secondary winding and tertiary winding receive magnetic coupling from the primary winding depending on a position of the probe along the LVDT electrical stroke.

In one embodiment, when the probe is within the portion of the LVDT electrical stroke where the high-accuracy tertiary winding is disposed, the tertiary winding produces position output function that is subject to less error than the standard-accuracy secondary winding.

In one embodiment, the primary winding surrounds the tertiary winding and the secondary winding surrounds the primary and tertiary windings.

In one embodiment, the primary winding surrounds the secondary winding and the tertiary winding surrounds the primary and secondary windings.

In one embodiment, the probe is a single probe comprising a single magnetic core.

In one embodiment, the probe is a single probe comprising an iron core.

In one embodiment, the LVDT includes a spacer arranged adjacent to the tertiary winding.

In one embodiment, the secondary winding and the tertiary winding each comprise a tapered winding configuration.

In one embodiment, the secondary winding and the tertiary winding each comprise multiple discrete coils.

In one embodiment, the secondary winding comprises a first coil part and a second coil part, the first and second coil parts electrically in series.

In one embodiment, the LVDT includes a first terminal connected to first end of the first coil part, a second terminal connected to a first end of the second coil part, and a common terminal connected to a second end of each of the first coil part and the second winding part.

In one embodiment, the tertiary winding comprises a first coil part and a second coil part, the first and second coil parts electrically in series.

In one embodiment, the secondary winding comprises a first secondary output, and the tertiary winding comprises a second secondary output.

In accordance with another aspect of the disclosure, an aircraft includes: a flight control surface arranged on the aircraft; and an LVDT as described herein operatively coupled to the flight control surface.

In one embodiment, the aircraft includes a flight controller for controlling a position of the flight control surface, the flight controller including a first output for controlling a position of the flight control surface, first input operatively coupled to the secondary winding, and a second input operatively coupled to the tertiary winding, the controller configured to control the position of the flight control surface based on a position feedback signal provided by the secondary and tertiary windings.

These and other features of the invention are more fully described and particularly pointed out in the description and claims set out below, and this Summary is not intended to identify key features or essential features of the claimed subject matter. The following description and claims and the annexed drawings set forth in detail certain illustrative embodiments of the invention, and these embodiments indicate but a few of the various ways in which the principles of the invention may be used.

DETAILED DESCRIPTION

Figure 1:
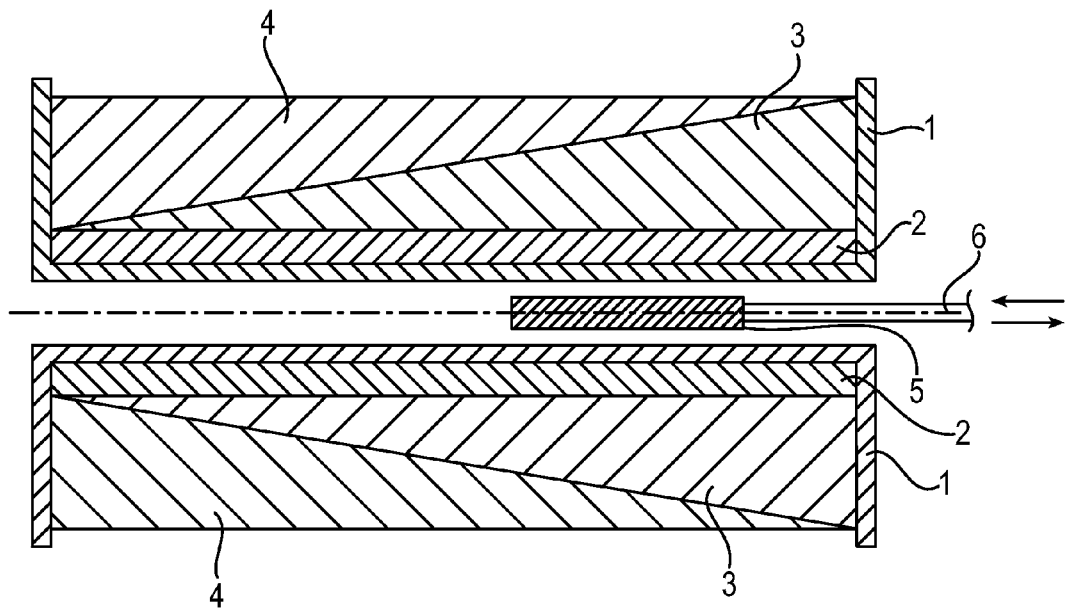
FIG. 1 is a longitudinal cross-section schematic view of a prior art tapered-winding LVDT.

An LVDT in accordance with the present disclosure provides multi outputs that include standard full travel secondary outputs and high precision secondary outputs for at least a portion of the total measurement range of the LVDT. The LVDT includes a probe assembly, such as a magnetic core probe assembly or the like, that moves axially along a length of the LVDT to create a variable coupling between the primary and two secondary windings.

For description purposes a "secondary output" is defined as being composed of a first and second secondary winding, which for example may be placed on a bobbin with wire turns and crossovers, such that difference of the first and second secondary voltages is divided by the sum of the same secondary voltages and represents the ratio-metric output function. The LVDT in accordance with the present disclosure includes at least one standard-accuracy secondary output that is designed to provide a ratio output throughout the full electrical stroke of the LVDT position sensor and at least one high-accuracy secondary output that provides a ratio output for a lesser portion of the full electrical stroke of the LVDT. The first and second secondary windings of the secondary outputs and the primary windings are arranged so that both the high-accuracy secondary and the full stroke secondary receive magnetic coupling from the primary winding depending on the probe position.

The high-accuracy secondary output provides a higher accuracy than the standard secondary output for a portion of the total travel. This is accomplished, for example, by dedicating the range of the high precision secondary winding's coupling to a more limited range of travel. When the core of the probe is within the portion of the electrical stroke where the high-accuracy LVDT secondary windings are magnetically coupled, a position output function is produced that is less subject to error relative to the stroke of the LVDT than the standard full travel secondary output. For example, position data from the standard-accuracy secondary output is used to provide absolute position data over the full stroke of the LVDT, and position data from the high-accuracy secondary output is used to provide incremental high-accuracy position data over a region of interest. The data from the respective secondary outputs is combined to provide high-resolution position data for the portion of the stroke in which the respective windings overlap.

In a layered winding arrangement the windings, depending on the LVDT construction, can be arranged to have the high-accuracy windings below or above the standard-accuracy windings. Other winding schedules can be used to accomplish the same high-accuracy secondary output function. The basic arrangement of this embodiment is the concentrically nested orientation of the windings allows for a shorter LVDT size, which is highly favorable for many applications such as actuator position sensing for a flight control actuator. Further, the distinction that this embodiment uses a single movable core on a single probe for both the standard and high-accuracy secondary outputs is an improvement over designs where two separate movable cores or two separate probes are used.

Figure 2:
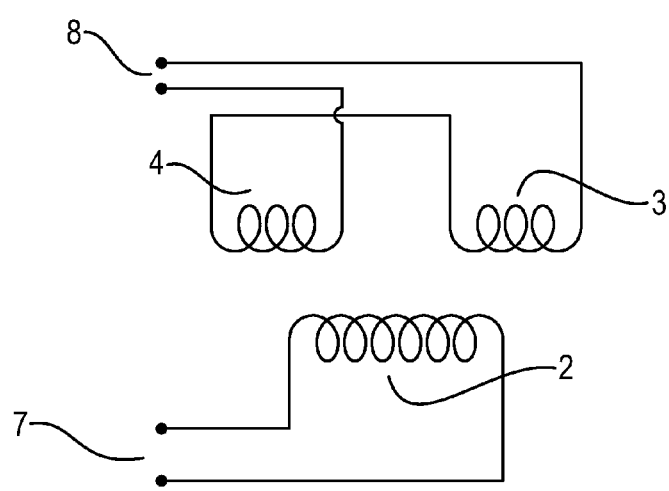
FIG. 2 is an electrical schematic drawing of the device shown in FIG. 1.

The LVDT in accordance with the present disclosure may best be understood by comparing it with the prior art. FIG. 1 is a longitudinal cross-section schematic view of a prior art tapered-winding LVDT. Major components include hollow coil form (or mandrel) 1, primary winding 2, first secondary winding 3, second secondary winding 4, moveable core 5, and non-ferrous connection rod 6. FIG. 2 is an electrical schematic of the device shown in FIG. 1.

Primary winding 2 is wrapped around cylindrically-shaped coil form 1. First secondary winding 3 is wrapped over primary winding 2 in a tapered shape, with a maximum number of wire wraps at the right end of the winding and a minimum number of wire wraps on the left end of the winding, as shown. Second secondary winding 4 is wrapped in complementary form over first secondary winding 3. As shown in FIG. 2, primary winding 2 terminates in excitation contacts 7, and secondary windings 3, 4 terminate in output signal contacts 8. Moveable core 5 is made from iron or other material having significant magnetic permeability.

When alternating electrical current flows through primary winding 2, a portion of the input voltage is coupled to secondary windings 3, 4 via the moveable core 5, and may be measured at output contacts 8. Since the secondary windings 3, 4 are wired with opposite polarity as shown in FIG. 2, the signal produced at the output contacts 8 is the difference between the induced voltages in the secondary windings 3, 4.

The amount of mutual inductance between primary winding 2 and secondary windings 3, 4 is a function of the physical position of moveable core 5. Referring to FIG. 1, when moveable core 5 is located near the right side of the device (as shown), the core is in proximity to the thick portion of first secondary winding 3, and is distant from the thick portion of second secondary winding 4. The induced voltage in the secondary windings 3, 4 is a function of the number of wire wraps in each winding and their proximity to the core 5; therefore, there will be a higher voltage induced in first secondary winding 3 than in second secondary winding 4 when the core is near the right side of the device, because winding 3 is thicker than winding 4 in the zone surrounding core 5. As the core 5 moves from right to left, it progressively induces more voltage into winding 4 and less voltage into winding 3, due to the varying thicknesses of each winding. At some particular point of core 5 displacement within the winding form 1, the voltages induced in the two windings 3, 4 are of equal magnitude. When these voltages are subtracted internal to the interface electronics, the result is zero. This position of the core is referred to as the "null position", which does not correspond to the core being in the physical center of the device, since the first secondary winding 3 is closer than second secondary winding 4 to the core 5 when the core 5 is centered in the device. This distance difference of the two windings 3, 4 results in more voltage induced into the closer winding.

Figure 2A:
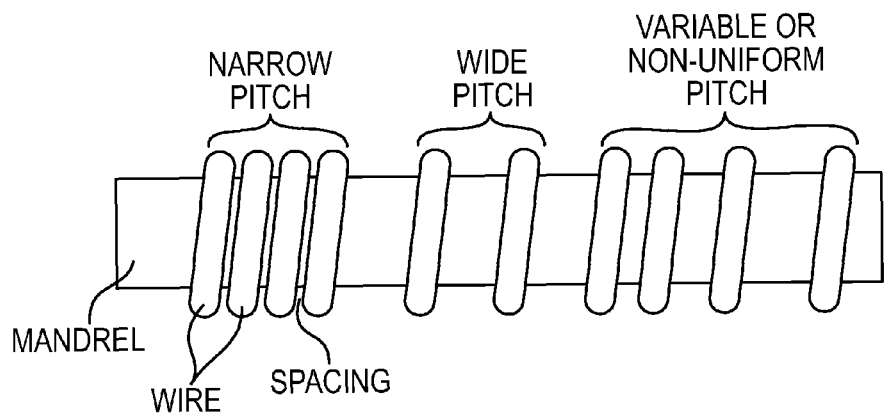
FIG. 2A is a diagram that explains the meaning of the term "pitch" in the context of the present disclosure.

Although the device shown in FIG. 1 is straightforward from a theoretical standpoint, the actual physical construction of such a device with tapered windings may be difficult or not possible to achieve. For example, consider a secondary winding having a wire diameter of 0.006 inch (34 gauge), a winding length of 3 inches, and a maximum thickness of 12 wire layers. Such a winding could not be physically constructed without a widely-spaced or non-uniform pitch of the winding wires. This arrangement would result in less wire length in the winding than if the adjacent wires on a layer were touching each other (i.e., narrow pitch), and the performance of the device would be adversely affected due to the reduced total wire length in the winding. In the context of the present disclosure, the term "pitch" refers to the spacing between adjacent wire wraps of the same winding, which can best be seen in FIG. 2A.

Figure 3:
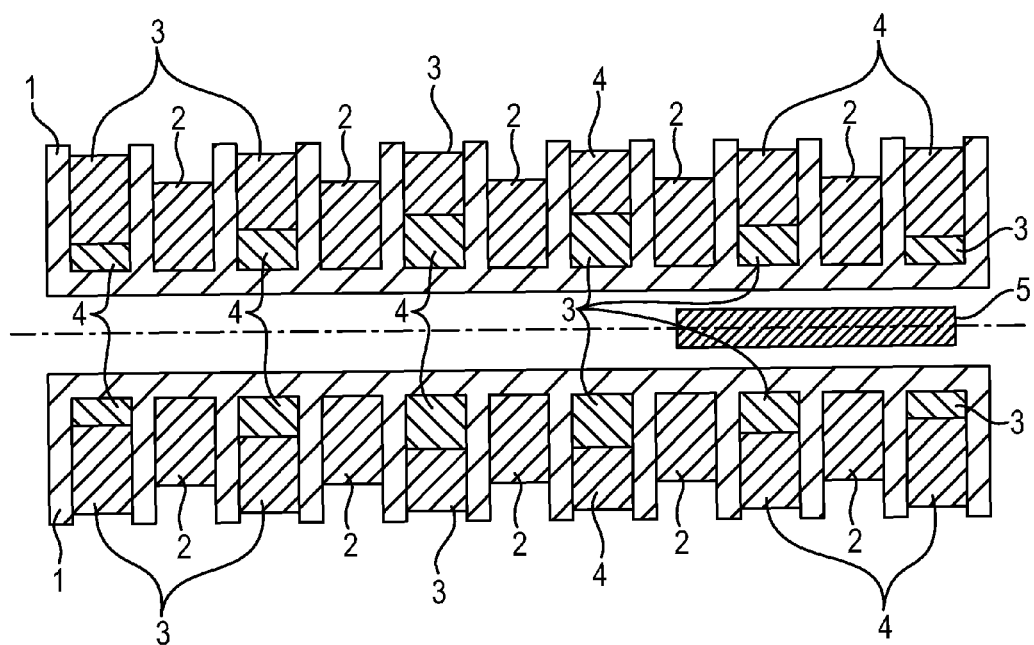
FIG. 3 is a longitudinal cross-section schematic view of another prior art LVDT utilizing multiple discreet windings.

FIG. 3 illustrates an alternative embodiment of the prior art. In this embodiment, multiple discrete windings are wound around a winding form 1 that comprises raised ribs to confine the winding wraps. As shown, the device incorporates multiple primary windings 2, multiple first secondary windings 3, multiple second secondary windings 4, and moveable core 5. Although this embodiment eliminates the requirement for winding tapered windings, it does require winding multiple small windings, which requires more labor than winding fewer large windings. Some currently available commercial devices use a variation of this embodiment, in which the windings are pre-wound on individual bobbins, then placed on the winding form and connected electrically. This arrangement requires numerous electrical connections on the fine winding wires in order to join the individual windings that make up the first secondary, the second secondary and the primary windings.

Figure 4:
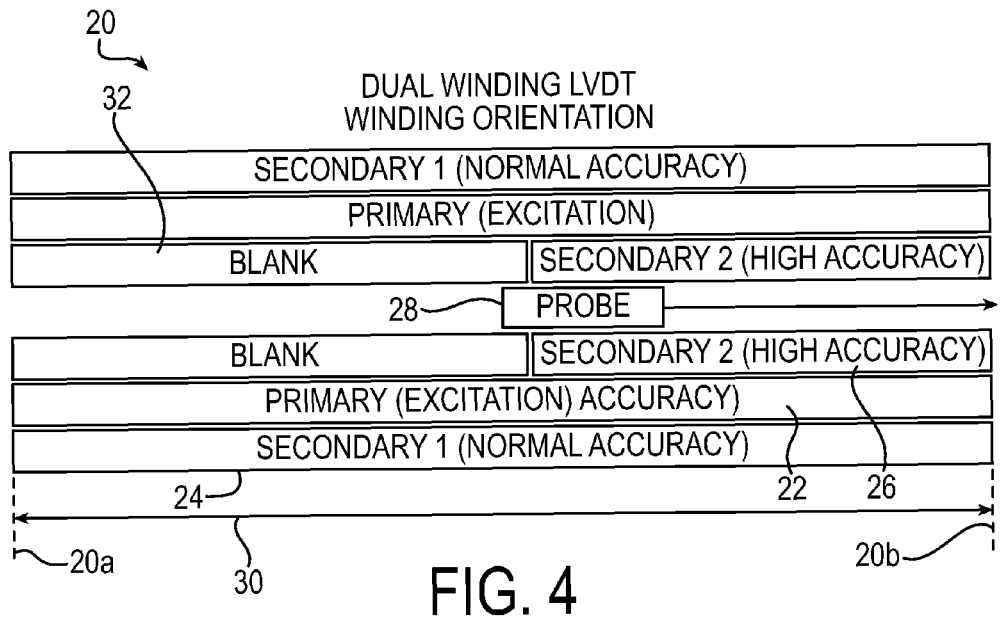
FIG. 4 is a schematic illustration of an exemplary LVDT in accordance with the present disclosure.

FIG. 4 is a longitudinal cross-section schematic view of a first embodiment of an LVDT in accordance with the present disclosure. The LVDT 20 has a first (primary) winding 22 that extends axially over a length of the LVDT 20, and a second (secondary) winding 24 that also extends axially over the length of the LVDT 20. The secondary winding 24 includes a first coil part 24a and a second coil part 24b electrically in series with the first coil part 24a, where signals $A_2$, $B_2$ and $COM_2$ are each brought to a separate terminal (see FIG. 6). A third (tertiary) winding 26 extends axially over less than the length of the LVDT and at least partially overlaps with the secondary winding 24. The tertiary winding 26 also includes a first coil part 26a and a second coil part 26b electrically in series with the first coil part 26a, where signals $A_3$, $B_3$ and $COM_3$ are each brought to a separate terminal. The LVDT of FIG. 4 may comprise tapered windings as shown in FIG. 1 or multiple discrete windings as shown in FIG. 3, or any other configuration known in the art. A probe 28 is axially movable along a length of the LVDT. The probe 28 may be an iron core probe and may be magnetic, and is couplable to a device in which a position measurement is to be made. The coupling to the device, for example, may be via a non-ferrous coupling member.

The primary, secondary and tertiary windings are arranged such that the secondary winding 24 and tertiary winding 26 receive magnetic coupling from the primary winding 22 depending on a position of the probe 28 along the LVDT electrical stroke. A longitudinal span of the primary winding 22 and the secondary winding 24 over which the probe 28 travels defines an electrical stroke 30 of the LVDT 20. For example, the electrical stroke 30 of the LVDT in FIG. 4 is defined as the span beginning at a first end 20a of the LVDT 20 and ending at a second end 20b of the LVDT 20. The electrical stroke 30 of the LVDT is the region in which the LVDT 20 provides data corresponding to a position of the probe 28 relative to a longitudinal axis of the windings 22, 24. If the probe 28 is no longer within the region defined by the electrical stroke 30, position data for the probe 28 cannot be provided.

The secondary winding 24 is a standard-accuracy winding that provides a ratio output over the length of the LVDT (e.g., over the full electrical stroke 30 of the LVDT), and the tertiary winding 26 is a high-accuracy winding that provides a ratio output for a lesser portion than the length of the LVDT (e.g., less than the full electrical stroke 30 of the LVDT). The tertiary winding may be located anywhere along the electrical stroke 30 of the LVDT as required by the specific application. For example, if higher resolution is desired at the first end 20a of the LVDT, then the tertiary winding 26 may be located nearer the first end 20a than the second end 20b. If higher resolution is desired along the mid-portion of the electrical stroke 30, then the tertiary winding 26 may be located at or near a center of the electrical stroke 30.

Figure 5:
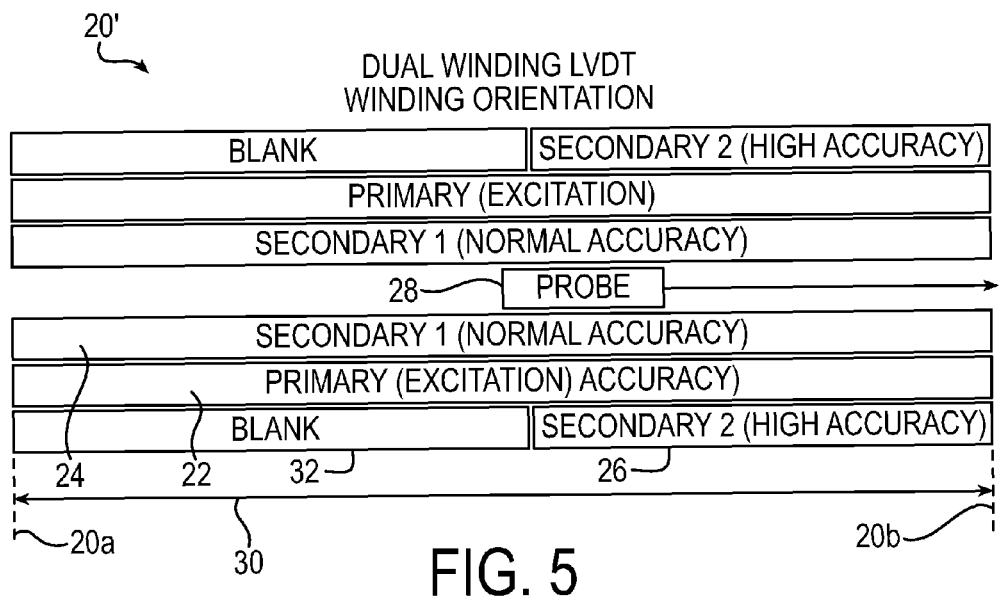
FIG. 5 is a schematic illustration of another exemplary LVDT in accordance with the present disclosure.

As shown in FIG. 4, the primary winding 22, secondary winding 24, and tertiary winding 26 are concentric. In the embodiment of FIG. 4, the primary winding 22 surrounds the tertiary winding 26 and the secondary winding 24 surrounds both the primary winding 22 and tertiary winding 26. FIG. 5 illustrates another embodiment of an LVDT 20' that is similar to the embodiment of FIG. 4, except that in the embodiment of FIG. 5 the primary winding 22 surrounds the secondary winding 24, and the tertiary winding 26 surrounds both the primary winding 22 and secondary winding 24.

Adjacent to each tertiary winding 26 is a spacer or "blank" 32 that occupies the remaining space along the electrical stroke 30 of LVDT not occupied by the tertiary winding 26. The spacer 32 may be formed, for example, from a non-ferrous material, such as plastic or the like. The spacer 32 may be bonded to one or more windings using a conventional adhesive or other fastening means. The spacer allows the subsequent winding(s) to be wound on a flat surface which will simplify the manufacturing process.

The primary, secondary and tertiary windings each have a number of turns per unit length (also referred to as a pitch). In one embodiment, the primary windings 22 have a first number of turns per unit length, the secondary windings 24 have a second number of turns per unit length, and the tertiary windings 26 have a third number of turns per unit length, where the third number of turns per unit length is greater than the second number of turns per unit length. In this manner, higher precision is achievable when the probe 28 is in the portion of the electrical stroke 30 that corresponds to the tertiary windings 26.

Figure 6:
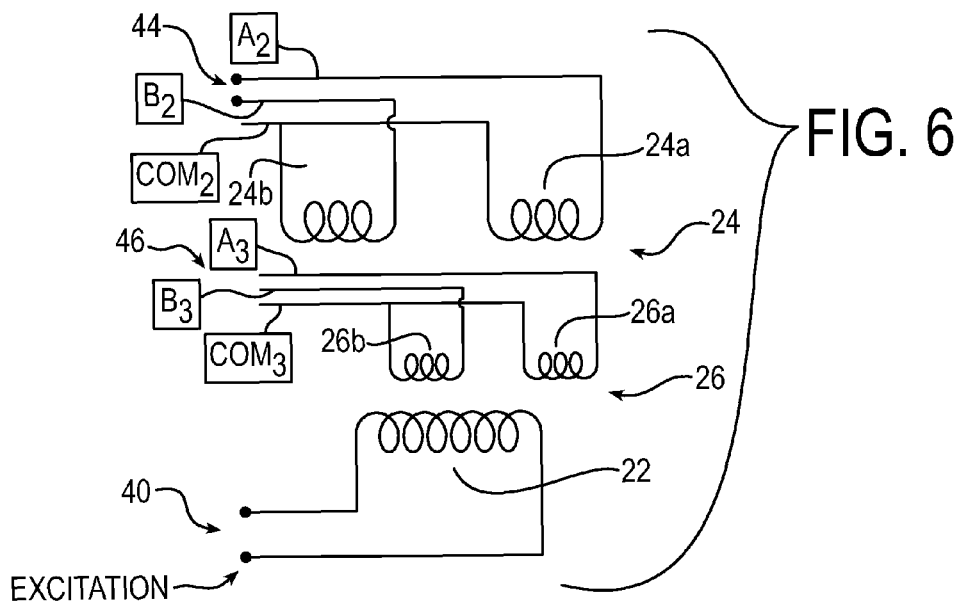
FIG. 6 is an electrical schematic drawing of the device shown in FIGS. 4 and 5.

FIG. 6 illustrates the electrical connections for the LVDT 20, 20' shown in FIGS. 4 and 5. More particularly, the primary winding 22 terminates in excitation terminals 40, the secondary windings 24 terminate in output terminals 44, and the tertiary winding 26 terminates in output terminals 46. Output terminals 44 correspond to a "secondary output" for the secondary winding 24, and output terminals 46 correspond to a "secondary output" for the tertiary winding 26.

A position of the probe 28 may be determined, for example, based on the equation $(A_n-B_n)/(A_n+B_n)$, where $A_n$ represents the voltage at terminal $A_n$ relative to terminal $COM_A$, $B_n$ represents the voltage at terminal $B_n$ relative to terminal $COM_A$, and n represents the particular winding (e.g., n=2 for the secondary winding, and n=3 for the tertiary winding).

When alternating current flows through the primary winding 22, a portion of the input voltage is coupled to the secondary winding 24 via the probe 28 and may be measured at terminals 44. Similarly, when the probe 28 is in a position corresponding to the tertiary winding 26, a portion of the input voltage is coupled to the tertiary winding 26 and may be measured at terminals 46. Due to the characteristics of the tertiary winding 26, increased accuracy is achieved.

As can be seen in FIG. 6, the secondary winding 24 includes a first coil part 24a and a second coil part 24b electrically in series with the first coil part 24a. Similarly, the tertiary winding 26 includes a first coil part 26a and a second coil part 26b electrically in series with the first coil part 26a. The first and second coil parts of secondary and tertiary windings are each wired with opposite polarity as shown in FIG. 6. The signals produced at the output terminals 44 and 46 are the A and B signals that will be used mathematically to calculate the LVDT position by the control electronics.

Figure 7:
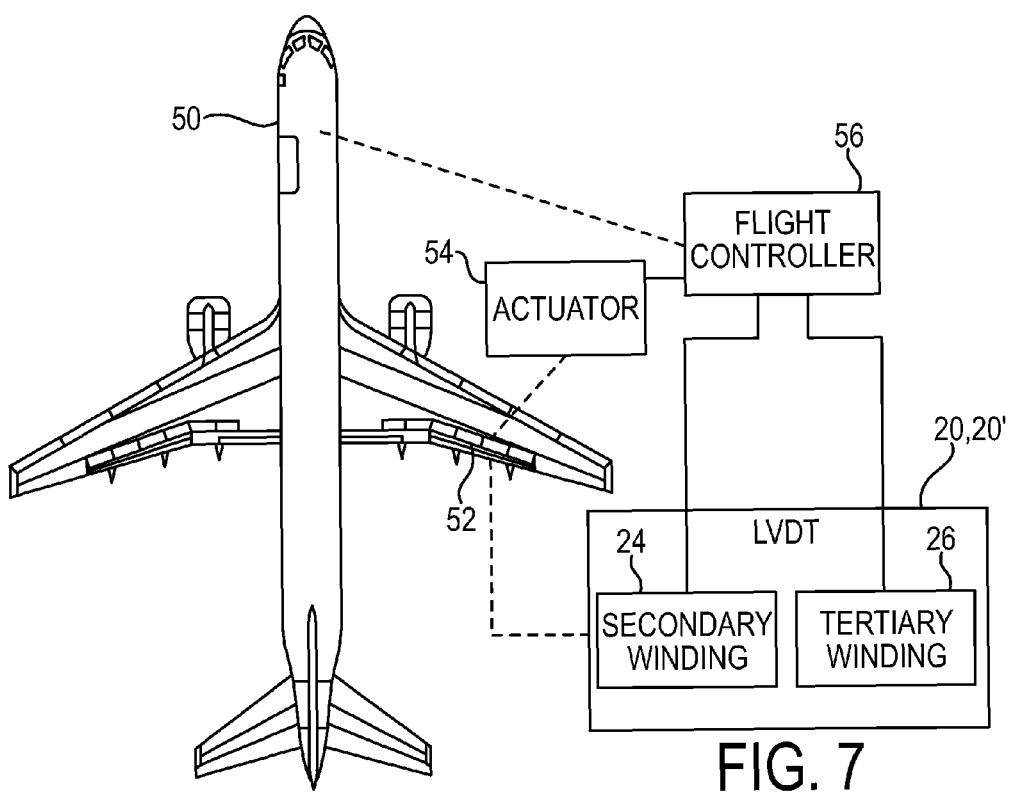
FIG. 7 is a schematic diagram of a system employing an LVDT in accordance with the present disclosure.

Moving to FIG. 7, illustrated is an aircraft 50 that employs an LVDT 20, 20' in accordance with the present disclosure. The aircraft 50 includes one or more flight control surfaces 52, such as spoilers, flaps or the like, that control the behavior of the aircraft 50 during flight. One or more actuators 54, such as electro-mechanical actuators, are operatively coupled to the flight control surfaces 52 to effect motion thereof. Also coupled to each flight control surface 52 is one or more LVDTs 20, 20' in accordance with the present disclosure. Thus, as a position of the flight control surfaces 52 are changed via the corresponding actuator 54, the LVDT 20, 20' will provide signals ratio-metrically related to the position.

The aircraft also includes a flight controller 56 having a first output operatively coupled to the actuator 54 to command the actuator to effect motion of the flight control surface, a first input operatively coupled to the secondary winding 24 of the LVDT, and a second input operatively coupled to the tertiary winding 26 of the LVDT. The flight controller 56 is configured to control the position of the flight control surface 52 based on a position feedback signal provided by the secondary and tertiary windings. Such configuration is advantageous in that it eliminates the need for a separate high-accuracy resolver sensor.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A linear variable differential transformer (LVDT) having an electrical stroke, comprising:
    a probe axially movable along a length of the LVDT electrical stroke;
    a primary winding extending axially over the length of the LVDT electrical stroke;
    a secondary winding extending axially over the length of the LVDT electrical stroke; and
    a tertiary winding extending axially over less than the length of the LVDT electrical stroke, the tertiary winding at least partially overlapping with the secondary winding.

2. The LVDT according to claim 1, wherein the primary winding, secondary winding, and tertiary winding are concentric.

3. The LVDT according to claim 1, wherein the primary winding comprises a first number of turns per unit length, the secondary winding comprises a second number of turns per unit length, and the tertiary winding comprises a third number of turns per unit length, the third number of turns per unit length greater than the second number of turns per unit length.

4. The LVDT according to claim 1, wherein the primary winding comprises a first winding pitch, the secondary winding comprises a second winding pitch, and the tertiary winding comprises a third winding pitch, the third winding pitch being narrower than the second winding pitch.

5. The LVDT according to claim 1, wherein the secondary winding is a standard-accuracy winding that provides a ratio output over the length of the LVDT, and the tertiary winding is a high-accuracy winding that provides a ratio output for a lesser portion than the length of the LVDT.

6. The LVDT according to claim 1, wherein the secondary winding is a standard-accuracy winding that provides a ratio output through the full LVDT electrical stroke, and the tertiary winding is a high-accuracy winding that provides a ratio output for a lesser portion of the full LVDT electrical stroke.

7. The LVDT according to claim 6, wherein when the probe is within the portion of the LVDT electrical stroke where the high-accuracy tertiary winding is disposed, the tertiary winding produces position output function that is subject to less error relative to the stroke of the LVDT than the standard-accuracy secondary winding.

8. The LVDT according to claim 1, wherein the windings are arranged such that the secondary winding and tertiary winding receive magnetic coupling from the primary winding depending on a position of the probe along the LVDT electrical stroke.

9. The LVDT according to claim 1, wherein the primary winding surrounds the tertiary winding and the secondary winding surrounds the primary and tertiary windings.

10. The LVDT according to claim 1, wherein the primary winding surrounds the secondary winding and the tertiary winding surrounds the primary and secondary windings.

11. The LVDT according to claim 1, wherein the probe is a single probe comprising a single magnetic core.

12. The LVDT according to claim 1, wherein the probe is a single probe comprising an iron core.

13. The LVDT according to claim 1, further comprising a spacer arranged adjacent to the tertiary winding.

14. The LVDT according to claim 1, wherein the secondary winding and the tertiary winding each comprise a tapered winding configuration.

15. The LVDT according to claim 1, wherein the secondary winding and the tertiary winding each comprise multiple discrete coils.

16. The LVDT according to claim 1, wherein the secondary winding comprises a first coil part and a second coil part, the first and second coil parts electrically in series.

17. The LVDT according to claim 16, further including a first terminal connected to one end of the first coil part, a second terminal connected to one end of the second coil part, and a common terminal connected to a second end of each of the first coil part and the second winding part.

18. The LVDT according to claim 1, wherein the tertiary winding comprises a first coil part and a second coil part, the first and second coil parts electrically in series.

19. The LVDT according to claim 1, wherein the secondary winding comprises a first secondary output, and the tertiary winding comprises a second secondary output.

20. The LVDT according to claim 1, wherein the position output of at least one of the secondary winding or the tertiary winding is computed by the ratio A−B/(A+B), where A represents the signal output from a first coil part of the respective winding and B represents the signal output of a second coil part of the respective winding.

21. The LVDT according to claim 1, wherein an overall position of the LVDT is calculated as a blending of the outputs of the secondary and tertiary winding over a small fraction of the LVDT electrical stroke as the probe transitions from a region where only the secondary winding is disposed to a region where both the secondary and tertiary winding are disposed.

22. An aircraft, comprising:
a flight control surface arranged on the aircraft; and
the LVDT according to claim 1 operatively coupled to the flight control surface.

23. The aircraft according to claim 22, further comprising a flight controller for controlling a position of the flight control surface, the flight controller including a first output for controlling a position of the flight control surface, first input operatively coupled to the secondary winding, and a second input operatively coupled to the tertiary winding, the controller configured to control the position of the flight control surface based on a position feedback signal provided by the secondary and tertiary windings.

24. The LVDT according to claim 1, wherein the electrical stroke is defined by a longitudinal span of the primary winding and the secondary winding over which the probe travels, and wherein the primary and secondary windings extend axially over the entire longitudinal span.

* * * * *